(12) United States Patent
Elshishiny et al.

(10) Patent No.: US 8,234,108 B2
(45) Date of Patent: Jul. 31, 2012

(54) BUILDING AND CONTRACTING A LINGUISTIC DICTIONARY

(75) Inventors: Hisham Emad Elshishiny, Giza (EG); Edel Greevy, Dublin (IE); Pai-Fang Franny Hsiao, Houston, TX (US); Alexey Nevidomskiy, Dublin (IE); Alexander Troussov, Dublin (IE); Pavel Volkov, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/316,511

(22) Filed: Dec. 11, 2011

(65) Prior Publication Data

US 2012/0084077 A1    Apr. 5, 2012

Related U.S. Application Data

(63) Continuation of application No. 11/306,394, filed on Dec. 27, 2005, now Pat. No. 8,090,571.

(30) Foreign Application Priority Data

Jun. 29, 2005 (GB) .................................. 0513225.3

(51) Int. Cl.
*G10L 11/00* (2006.01)
(52) U.S. Cl. .......................................................... 704/9
(58) Field of Classification Search ....................... 704/9
See application file for complete search history.

(56) References Cited

U.S. PATENT DOCUMENTS

| 6,009,382 A | 12/1999 | Martino et al. |
| 6,298,321 B1 | 10/2001 | Karlov et al. |
| 6,502,064 B1 | 12/2002 | Miyahira et al. |

OTHER PUBLICATIONS

Wechsler, et al.,"Multi-Language Text Indexing for Internet Retrieval," In Proc. of the 5th RIAO Conf., Computer-Assisted Information Searching on the Internet, Montreal, Canada, pp. 217-232, 1997.
Inselkammer, F., "Knowledge Management based on a Question Answer System," [online] <http://ebookbrowse.com/inselkammer-franz-qbkm-pdf-d12332404>, 14 pgs, May 3, 2004.

*Primary Examiner* — Justin Rider
(74) *Attorney, Agent, or Firm* — Cuenot, Forsythe & Kim, LLC

(57) ABSTRACT

A method for building and contracting a linguistic dictionary, the linguistic dictionary comprising a list of surface forms and a list of normalized forms, each normalized form being associated with a surface form, the method comprising the steps of: comparing each character of a surface form with each character of the surface form's normalized form; in response to the comparing step, determining an edit operation for each character compared; and generating a transform code from the set of the edit operations in order to transform the surface form to its normalized form.

23 Claims, 12 Drawing Sheets

BUILDING AND CONTRACTING A LINGUISTIC DICTIONARY

CROSS-REFERENCE TO RELATED APPLICATIONS

This application claims the benefit of United Kingdom Application Serial Number 0513225.3 filed on Jun. 29, 2005, which is fully incorporated herein by reference. This application is a Continuation of U.S. application Ser. No. 11/306,394, filed on Dec. 27, 2005.

FIELD OF THE INVENTION

The invention relates to the field of natural language processing. In particular, the invention relates to a method and system for building and contracting a linguistic dictionary having normalized forms.

BACKGROUND OF THE INVENTION

Many natural language applications require the use of one or more linguistic dictionaries; for example, word processing, linguistic searching, information extraction, information retrieval, spelling aids and query correction applications for search engines etc.

The complexity of building a linguistic dictionary is an enormous task. For example, in the English language there are over 616,500 word forms. To store each of these word forms in a permanent storage medium, on a computer, requires the utilization of a high volume of disk storage, which is expensive and often not desirable from a user's perspective or a developer's perspective. Further, to locate a word quickly, an efficient retrieval mechanism is required. Thus the selection of a suitable data structure for the organization, storage and retrieval of the word forms and/or phrases that form a language is a critical one.

There are many data structures that exist which allow data to be stored and retrieved in a structured way, these range from arrays and linked lists to tree-based data structures comprising a number of nodes and associated child nodes.

One type of data structure which is well suited to the storage and retrieval of linguistic data is a trie-data structure. The term "trie" stems from the word "retrieval". Trie structures are multi-way tree structures which are useful for storing strings over an alphabet. Trie structures are used to store large dictionaries of words. The alphabet used in a trie structure can be defined for the given application, for example, {0, 1} for binary files, {the 256 ASCII characters}, {a, b, c . . . x, y, z}, or another form of alphabet such as Unicode, which represents symbols of most world languages.

The concept of a trie data structure is that all strings with a common prefix propagate from a common node. A node has a number of child nodes of, at most, the number of characters in the alphabet and a terminator. The string can be followed from the root to the leaf at which there is a terminator that ends a string. For example, an English-language dictionary can be stored in this way. A trie-based dictionary has the advantage that the data is compressed due to the common entries for prefixes (word constituents that can be concatenated at the beginning of a word) and possibly postfixes (a word constituent that can be concatenated at the end of the word).

An example of a trie-based structure 100 is shown in FIG. 1. The trie-based structure 100 stores four words do, did, don't and didn't. The trie-based structure 100 is a multi-way tree structure with a root node 101 from which child nodes 102 to 108 extend. In turn, each child node 102 to 108 can become a parent node with child nodes of its own. The nodes in the trie-based structure 100 represent characters in an alphabet and a string of characters is represented by following a route down the trie from the root node 101 to a leaf node 104. Leaf nodes are provided by terminators 104, 105, 107 for a recognized string of characters 104, 105, 107.

An example of one such route is illustrated—starting from the parent node 101 which comprises the letter 'd' down to the child node 104 representing the letter 'o'. Thus following this route the string 'do' is derived. The string 'do' is a recognized word and therefore a terminator node 104 which is also a child node denotes that the string 'do' is a recognizable word.

Similarly, the following recognized words are shown in the trie-based dictionary 100: "don't", "did", "didn't". Where each valid word ends, a terminator node 104, 105, 107 is provided. The terminator node is referred to as a gloss node where the root-to-terminal path string is a valid dictionary entry.

This type of trie-based linguistic dictionary provides low computational complexity whilst performing simple or approximate lookups.

A problem occurs in developing text processing applications for languages, such as Arabic, for example. The Arabic language is a highly inflected language with a complex morphology and thus building a trie-based dictionary of a reasonable size with attached morphology information is a challenging problem.

The attachment of morphology information to a list of words (surface forms), including part of speech, vocalized forms and normalized forms presents unique challenges for achieving a dictionary contraction ratio in a trie-based structure that is comparable to the contraction ratio that can be achieved when a trie-based structure comprises only surface forms.

Thus, building trie-based linguistic dictionaries for languages such as Arabic results in a large dictionary size. This in turn may hamper their use in industrial applications.

Existing methods for contracting trie-based linguistic dictionaries are mainly implemented by first creating a number of surface forms (possibly provided with any additional information such as annotations and lemmas), next converting the list into a letter tree with common pre-fixes being factored out, and finally, performing contraction where common post-fixes are factored out, thus arriving at a normalized form of the surface form. A normalized form accounts for typographic and inflectional variations in a word, such as, the different inflection variants of the same word. For example table is the normalized form of tables. Attaching the normalized forms of words to their corresponding surface forms is not an efficient method of storing because both the surface form and the normalized form must be stored together.

A known method for contracting linguistic dictionaries with normalized forms is a cut and paste technique which operates by describing how many characters of the surface form must be removed and which characters must be added to the end of the surface form to arrive at the normalized form (postfix contraction). An example of this is shown in Example 1.

EXAMPLE 1

Surface form: 'butterflies'
Normalized form: 'butterfly'

The exemplary cut and paste algorithm parses the surface form and compares each character of the surface form with each character of the word in the normalized form. Thus the characters 'b, u, t, t, e, r, f, l' are identical in the surface form and the normalized form. The characters 'i', 'e', 's' in the surface form are not present in the normalized form and therefore the cut and paste algorithm records that 3 characters after the letter 'l' must be deleted and replaced with the letter 'y' to arrive at the normalized form. Hence the cut and past algorithm records the operation '(3,'y')'.

The use of this cut and paste algorithm does not provide an effective dictionary contraction for Arabic as it only operates on the postfix of the words. This is because many Arabic words comprise infixes (letters inserted in the middle of words), which will not be accounted for by this postfix cut and paste algorithm.

Furthermore, Arabic morphology is very complex because of the irregularities between the lexical and surface strings. Moreover, in Arabic languages inflectional patterns are not completely concatenative but interdigitate or intercalate. As a result, Arabic words have infixes and cannot be contracted by the prefix cut and paste method only.

One prior art method of compressing Arabic text is discussed in an article by Al-Fedaghi and Al-Sadoun, titled 'Morphological compression of Arabic text'. The compression algorithm replaces some words in the original Arabic text by their roots and morphological patterns. The words which are replaced are compressed into a three-byte format. Although the authors claim that a twenty to thirty percent reduction ratio can be obtained, the compression method does have a number of drawbacks. For example, the compression method reduces Arabic words to a root and a morphological pattern. But a problem arises because not all Arabic words are derived from this combination of roots and morphological patterns, for example, some Arabic nouns. Thus there will be a proportion of Arabic words that can not benefit from the morphological compression method.

Another known solution is discussed in an article titled 'A compression technique for Arabic dictionaries: the affix analysis' by Ben Hamadou and presented at the 11th International Conference on Computational Linguistics in West Germany on the 25-29 Aug. 1986. The article proposes a compression dictionary algorithm based on affix analysis of the non-diacritical Arabic. The algorithm comprises decomposing a word into its first elements taking into account the different linguistic transformations that can affect the morphological structures. A drawback of using this type of compression algorithm is that the algorithm requires the use of manual definition and allocation of transform codes to each word or group of words. Manual definition of transform codes for millions of words is a very difficult task to accomplish.

Therefore a new method and system for contracting a linguistic dictionary is needed in order to build dictionaries with attached word morphology information, which have a reasonable data size and a small memory footprint.

DISCLOSURE OF THE INVENTION

According to a first aspect, the present invention provides a method for building and contracting a linguistic dictionary, the linguistic dictionary comprising a list of surface forms and a list of normalized forms, each normalized form being associated with a surface form, the method comprising the steps of: comparing each character of a surface form with each character of the surface form's normalized form; in response to the comparing step, determining an edit operation for each character compared; and generating a transform code from the set of the edit operations in order to transform the surface form to its normalized form.

The invention advantageously provides a method for generating a series of transform codes for each surface form. Each transform code details the operational steps required in order to transform a surface form to its normalized form. The transform codes are automatically generated by the invention and stored with the surface forms. Thus, providing the advantage of not having to store each surface form and its normalized form—therefore reducing the size of the dictionary.

Preferably, the invention provides a method wherein an edit operation comprises deleting a character, retaining a character, or inserting a character in to the surface form to derive the normalized form of the surface form. Thus when using the invention for highly inflected languages such as Arabic the invention is able to deal with postfix characters, prefix characters and infix characters within the surface form.

Preferably, the present invention provides a method further comprising determining a global frequency for each of the generated transform codes. By determining a global frequency for each of the transform codes it is possible to detect how many times each transform code appears in the dictionary. For each surface form comprising more than one transform code the transform code with the highest global frequency is selected as the preferred transform code to be used for each surface form using the same transform code. Advantageously, because a surface form may have more than one transform code for each normalized form, the dictionary size may be reduced by sharing transform codes across surface forms.

Preferably, the present invention provides a method wherein the linguistic dictionary comprises a trie-based data structure. A trie-based structure provides the advantage of being able to efficiently store language representations.

Preferably, the invention provides a method wherein the surface forms and normalized forms comprise Arabic surface forms and Arabic normalized forms.

Preferably, the present invention provides a method further comprising the step of calculating a usage rate for transform codes which occur the greatest number of times and selecting the transform code with the highest usage rate as the preferred transform code for storing. Calculating the usage rate of each transform code allows the transform codes that are actually used to be stored in the dictionary.

Preferably, the present invention provides a method further comprising the steps of stemming the surface forms to derive a normalized form and applying a pruning algorithm.

Preferably, the present invention provides a method wherein the stemming step comprises generating a trie-based index for information retrieval applications.

Preferably, the present invention provides a method wherein the pruning step comprises populating a trie-based data structure with a surface form and generating a generic rule for applying to the surface form.

Preferably, the present invention provides a method wherein the generic rule describes how the surface form is to be processed.

Preferably, the present invention provides a method wherein the pruning step further comprises traversing the trie-based structure from node to node until a generic rule is found, comparing the generic rule to a most frequently occurring rule and if the generic rule is identical to the most frequently occurring rule removing the nodes associated with the generic rule.

Preferably, the present invention provides a method wherein only the exceptions to the generic rule are stored in the trie-based data structure.

Advantageously, by combing the invention with a stemming algorithm and a pruning algorithm, the invention is particularly suitable for information retrieval applications.

Using stemming techniques provides a solution which is configurable allowing users to fix errors, or cater for behaviors not already handled by the invention. The addition of a pruning algorithm allows a further contraction of the dictionary while retaining the full fidelity of the original lexicon. The algorithmic transform codes provide an optimal way of creating normalized forms therefore giving further savings on memory.

Viewed from a second aspect, the present invention provides a system for building and contracting a linguistic dictionary, the linguistic dictionary comprising a list of surface forms and a list of normalized forms, each normalized form being associated with a surface form, the method comprising the steps of: a parsing component for comparing each character of a surface form with each character of the surface form's normalized form; an edit operation component for determining an edit operation for each character compared; and the edit operation component generating a transform code from the set of the edit operations in order to transform the surface form to its normalized form.

Viewed from a third aspect the present invention provides a computer program product loadable into the internal memory of a digital computer, comprising software code portions for performing, when said product is run on a computer, the invention as described above.

BRIEF DESCRIPTION OF THE DRAWINGS

Embodiments of the invention are described below in detail, by way of example only, with reference to the accompanying drawings in which.

DETAILED DESCRIPTION OF THE DRAWINGS

Figure 1:
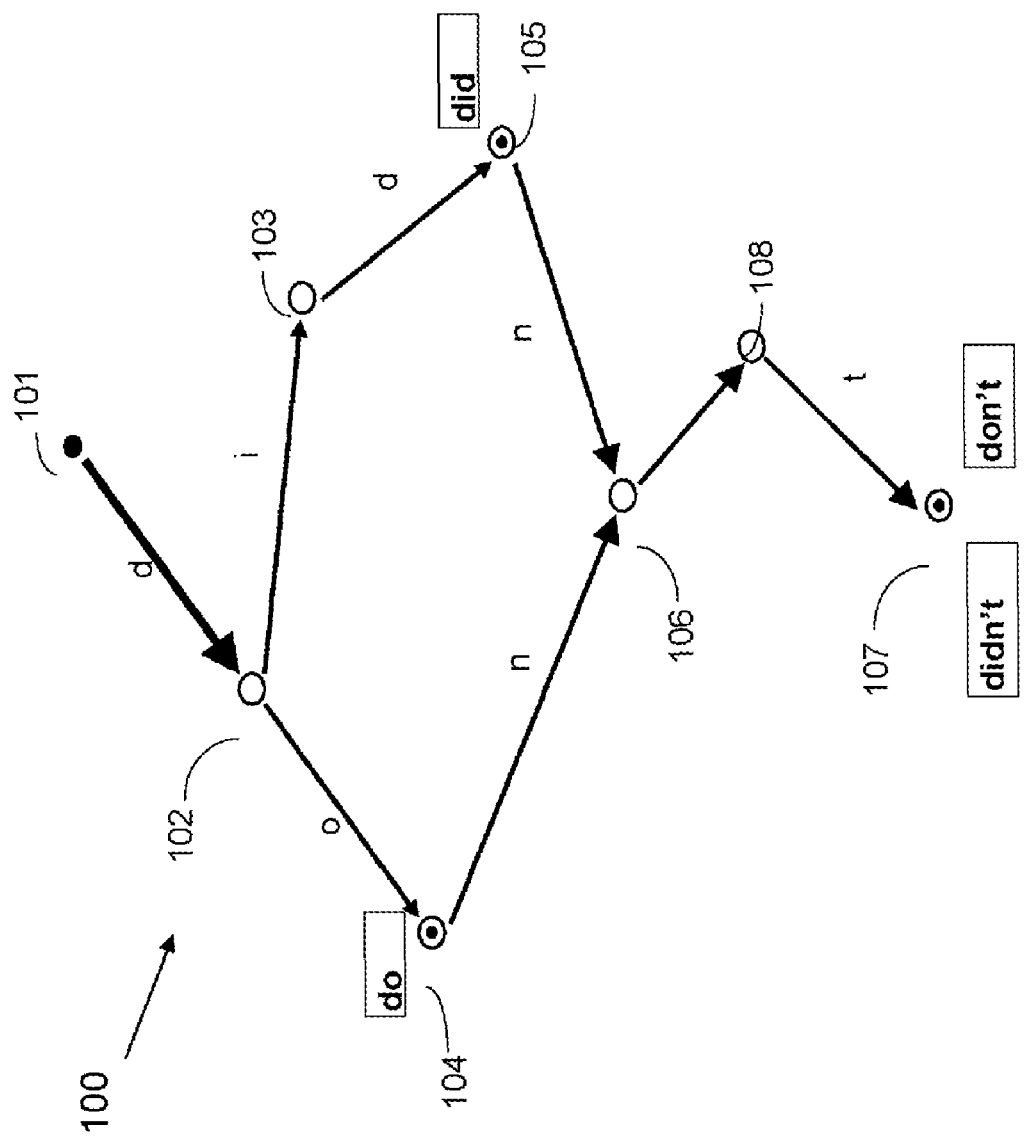
FIG. 1 illustrates an example of a known contraction method.
Figure 2:
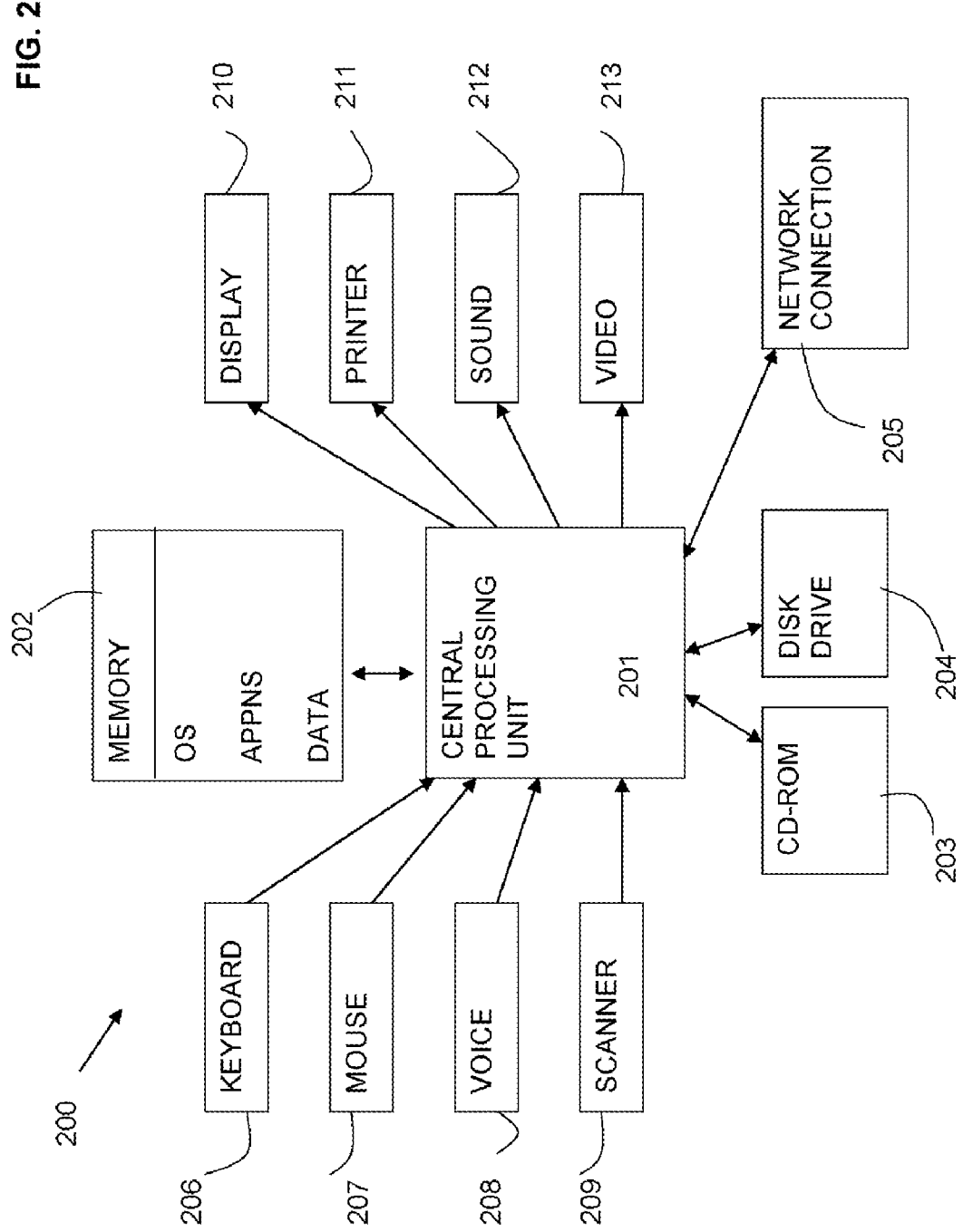
FIG. 2 is a schematic block diagram showing a computer system in accordance with a preferred embodiment of the present invention.

Referring to FIG. 2, a computer system 200 is shown on which a preferred embodiment of the present invention may be implemented. A computer system 200 has a central processing unit 201 with primary storage in the form of memory 202 (RAM and ROM). The memory 202 stores program information and data acted on or created by the programs. The program information includes the operating system code for the computer system 200 and application code for applications running on the computer system 200. Secondary storage includes optical disk storage 203 and magnetic disk storage 204. Data and program information can also be stored and accessed from the secondary storage.

The computer system 200 includes a network connection means 205 for interfacing the computer system 200 to a network such as a local area network (LAN) or the Internet. The computer system 200 may also have other external source communication means such as a fax modem or telephone connection.

The central processing unit 201 comprises inputs in the form of, as examples, a keyboard 206, a mouse 207, voice input 208, and a scanner 209 for inputting text, images, graphics or the like. Outputs from the central processing unit 201 may include a display means 210, a printer 211, sound output 212, video output 213, etc.

In a distributed system, a computer system 200 as shown in FIG. 2 may be connected via a network connection 205 to a server on which applications may be run remotely from the central processing unit 201 which is then referred to as a client system.

Applications may run on the computer systems from a storage means or via a network connection which may include word processing programs, Internet access programs including search engines for searching the World Wide Web, other text indexing and retrieving programs for databases, machine translation programs for translating foreign language documents, optical character recognition programs for recognizing characters from scanned documents, etc.

Figure 3:
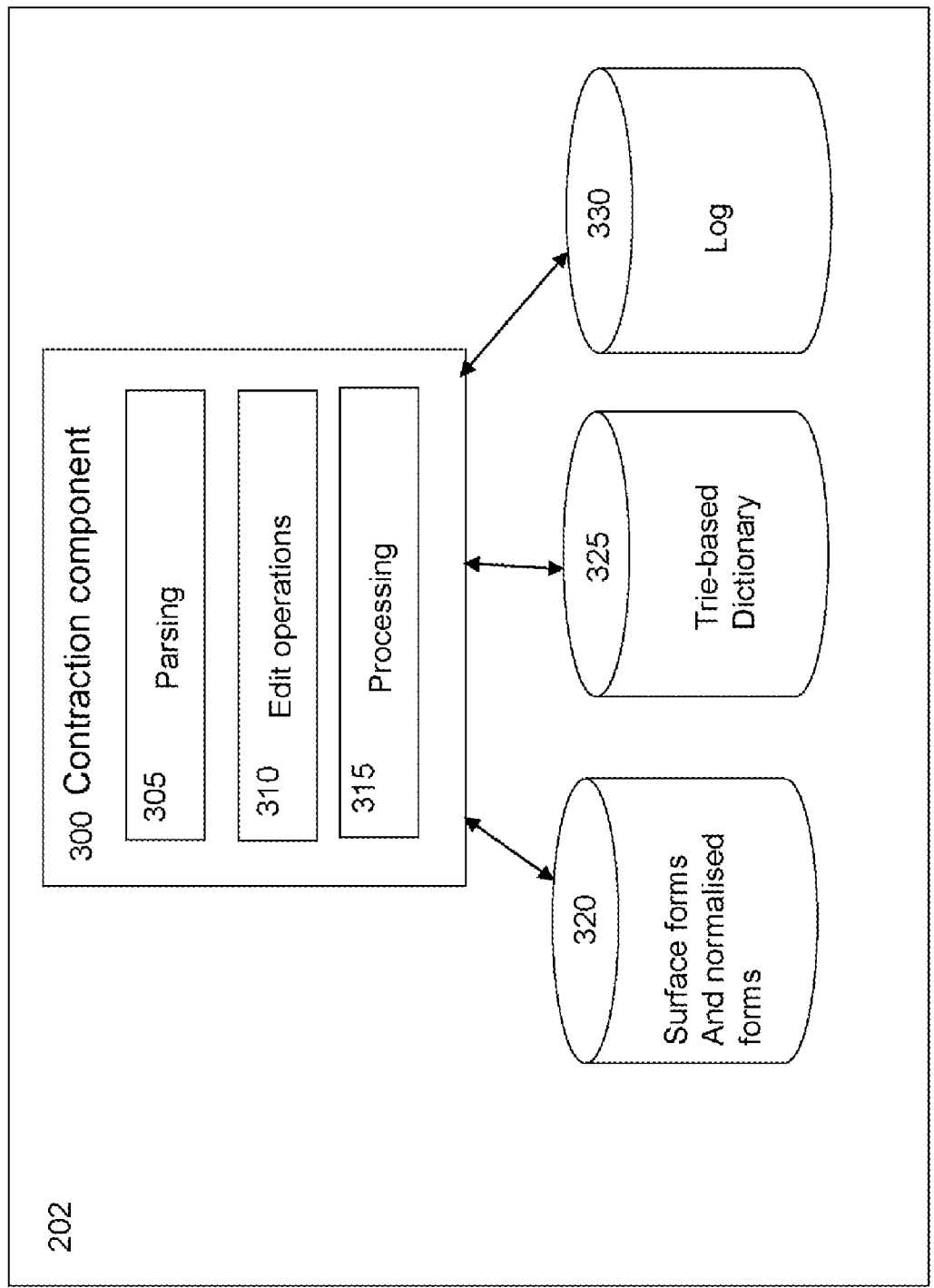
FIG. 3 is a component diagram showing the components of a preferred embodiment of the invention.

FIG. 3 shows the components of a preferred embodiment of the present invention. The present invention provides an enhancement to current natural language applications in the form of a contraction component 300 which interfaces with natural language applications to build a contracted linguistic trie-based dictionary for highly inflected languages such as Arabic. The contraction component 300 may be installed as part of the functionality of a natural language application or as an add-on component, that users may download and install to enhance the functionality of their existing natural language applications. The contraction component 300 comprises several sub-components: namely, a parsing component 305, an edit operation component 310 and a processing component 315 which interact with each other to build and contract a trie-based linguistic dictionary. The parsing component 305 parses data stored in a data store 320. The data may be in the form of a list of surface forms and their associated normalized form. The data store 320 may comprise any storage and/or retrieval mechanism that is suitable for use with a trie-based data structure 100.

The parsing component 305 identifies each surface form and its associated normalized form and performs a comparison of each character of the surface form with each character of its normalized form. As the parsing component 305 parses each character the edit operation component 310 identifies the edit operations that should be performed on the surface form in order to derive the normalized form, for example transforming 'tables' to 'table'. As each character is compared the appropriate edit operation is written to a log. For each surface form a string of edit operations is recorded. The string of edit operations forms a transform code for informing a subsequent application, for example, a spell checking application how to derive a normalized form from the surface form.

The types of edit operations identified by the edit operations component 310 are as follows:

codeAccept='!';

If a character in the surface form is identical to the character in the normalized form a codeAccept operation is performed i.e. keep this character and write '!' to the log.

codeDelete='~';

If a character in the surface form is not identical to the character in the normalized from a codeDelete operation is performed by deleting the non-identical character from the surface form and writing '~' to the log.

codeDeleteAll='^';

If all consecutive characters in the surface form are not identical to the consecutive characters in the normalized from a codeDeleteAll operation is performed by deleting all letters of the surface form and writing '^' to the log.

codeInsertion=''

If a character in the surface form is not identical to the character in the normalized form, a codeInsertion operation is performed by inserting the character into the surface form and writing '' to the log.

Example 2 shows an example of the edit operations component 310 in use.

EXAMPLE 2

Surface form: 'fishing'
Normalized form: 'fish'

The parsing component 305 begins by parsing the surface form 'fishing' from right to left (from left to right for Arabic, as the direction of writing is from right to left for Arabic) and comparing each character of the surface form with its normalized form 'fish'. The recorded operations are as follows (with an explanation of the operations followed in brackets):

EXAMPLE 2

| Operation | Explanation |
|---|---|
| ~~~ | Delete 3 characters 'ing' |
| ~~~~h | Insert 'h', delete next 4 characters |
| ~s!~~~ | Delete next 3 characters, accept 1 character, insert 's', delete 1 character |
| ~~~~~sh | Insert 'sh', delete next 5 characters |
| ~i!!~~~ | Delete next 3 characters, accept 2 characters, insert 'i', delete 1 character |
| ~~is!~~~ | Delete next 3 characters, accept 1 character, insert 'is', delete next 2 characters |
| ~~~!~~sh | Insert 'sh', delete next 2 characters, accept 1 character, delete next 3 character |
| ^f!!~~~ | Delete next 3 characters, accept next 3 characters, insert 'f', delete the remaining characters |
| ^fi!!~~~ | Delete next 3 characters, accept 2 characters, insert 'fi', delete the remaining characters |
| ^fis!~~~ | Delete next 3 characters, accept 1 character, insert 'fis', delete the remaining characters |
| ^fish | Insert 'fish', delete remaining characters |

As is shown in Example 2, there are twelve possible transform codes, for the surface form 'fishing' that may be generated to derive the normalized form of 'fish'.

In order to generate the transform codes on a list of surface forms, a recursive procedure is used to parse the list of surface forms and their normalized form. The following pseudo code, in Example 3, is an example of how the recursive procedure may be performed.

EXAMPLE 3

```
set surface;
    set normalized;
    gatherCode("", 0, 0); //"" presents an empty string
    void gatherCode(String code, int surfacePosition, int normalizedPosition)
    {
        if(surfacePosition == surface.length( ) and normalizedPosition == normalized.length( ))
        {
        replace opening sequence of codeDelete by codeDeleteAll
        print code;
        return;
        }
        if(surfacePosition == surface.length( )) //insertion
        {
        gatherCode(code+normalized.charAt(normalized), surfacePosition, normalizedPosition+1);
        return;
        }
        if(normalizedPosition == normalized.length( ))//deletion
        {
        gatherCode(code + codeDelete, surfacePosition + 1, normalizedPosition);
        return;
        }
        if(normalized.charAt(normalizedPosition) == surface.charAt(surfacePosition)
        {//exact match
        gatherCode(code+codeAccept, surfacePosition+1, normilisedPosition+1);
        }
        //insertion
        gatherCode(code + normalized.charAt(normalizedPosition), surfacePosition,
    normalizedPosition + 1);
        //deletion
        gatherCode(code + codeDelete, surfacePosition + 1, normalizedPosition;
    }
```

Although the parsing component parses 305 the surface forms from left to right, the surface forms may also be parsed from right to left at the time of restoration of the normalized form. Thus it will be appreciated by a person skilled in the art that these steps may be performed in any order. For example, the parsing operation may be performed by parsing right to left and the reconstruction operation may be performed left to right.

Example 4 shows a number of transform codes for a surface form in Arabic.

EXAMPLE 4

Surface form: مجتمعا
Normalized form: ب ح
Possible transform codes parsed from right to left:

| Transform code | Explanation |
| --- | --- |
| ا ~~~ ! | delete next 3 letters, accept one letter, insert ا |
| ~~~ ! ح | insert ح , accept 1 letter, delete next 3 letters |
| ~~~~ ح ا | insert ح ا, delete next 4 letters |
| ب ا ح | insert ب ا ح, delete all remaining letters |

Therefore as shown in Examples 2 and 4 there are many transform codes which can be generated for any given surface form. To store each of the transform codes with each terminal node in the trie-based dictionary would require a large amount of storage. Therefore there is a need to contract the trie-based dictionary further. As already explained for each surface form there may be more than one transform code. The same transform code may be generated for a number of surface forms. Therefore it is possible to share transform codes across terminal nodes.

In order to contract the trie-based dictionary 100 further it is necessary to minimize the number of terminal nodes (Gloss nodes) 104, 105, 107 which are stored. The processing component begins by calculating the global frequency of each of the transform codes. The transform code with the highest global frequency is selected as the transform code to be shared across the terminal nodes.

In order to calculate global frequencies, the processing component 315 performs a processing step on the input list of surface forms and normalized forms and stores the generated transform codes in the trie-based dictionary 100 with integer-type glosses for analysis to determine the most beneficial contraction ratio.

Figure 4:
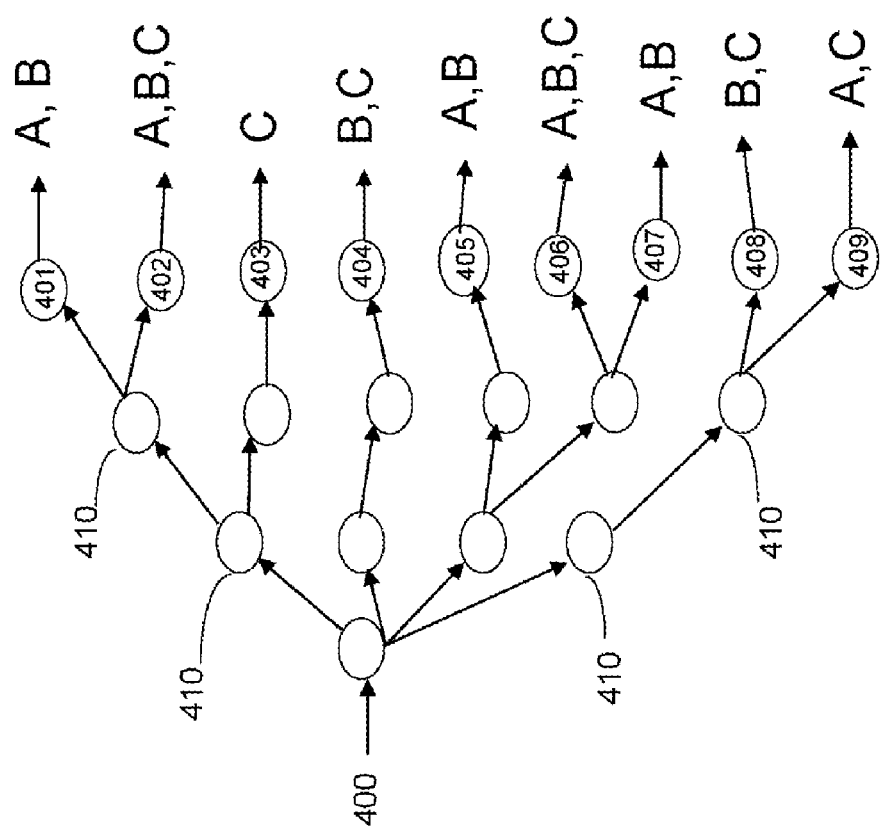
FIG. 4 is an example of an uncontracted trie-based dictionary as is known.
Figure 5B:
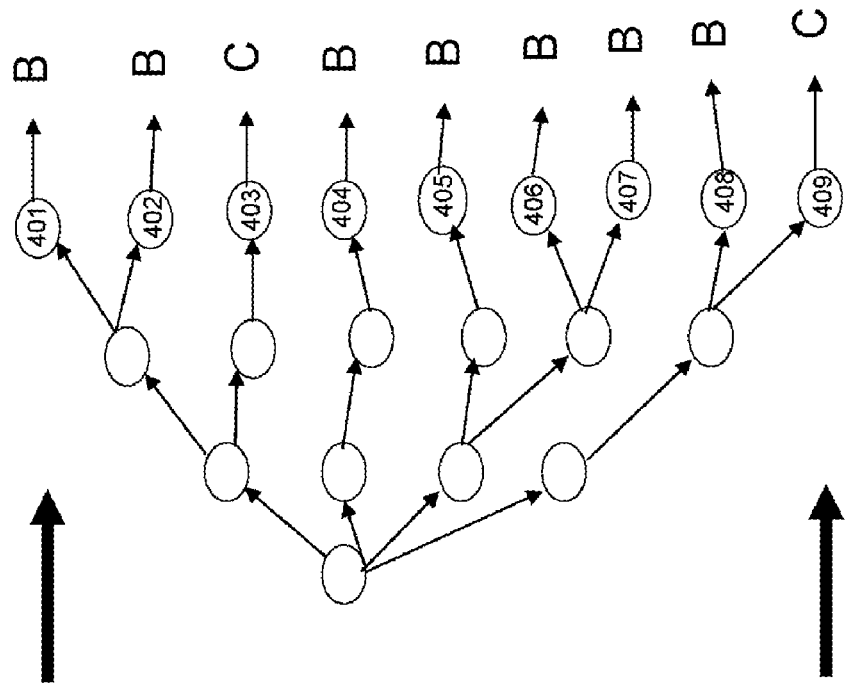
FIGS. 5a and 5b are examples of an uncontracted trie-based dictionary with the most frequently occurring transform codes remaining.
Figure 5A:
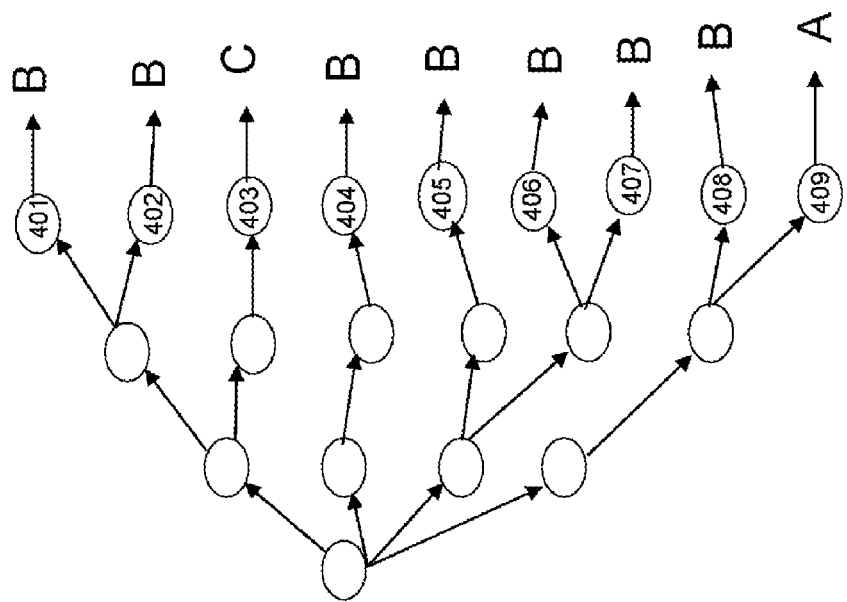

FIGS. 4, 5a and 5b explain the steps of the processing component 315 further. FIG. 4 shows a trie-based dictionary 100 with a root node 400 and a plurality of child nodes 410. A child node 410 may also be a terminal node 401 to 409. A terminal node 401 to 409 comprises at least one transform code. A transform code is represented by the characters A, B and/or C. Each character represents a different transform code and the same transform code can be applicable to one or more child nodes. For example terminal node 401 comprises transform codes A and B. Which means that transform codes A or B can be applied to the surface form of the terminal node 401 to arrive at a normalized form.

In order to compact the trie-based dictionary further, the processing 315 component parses the trie-based dictionary 100 and calculates the global frequency for each of the transform codes. The table in Example 5 shows the global frequency index for each of the transform codes associated with each of the terminal nodes as shown in FIG. 4 and the total global frequency for each transform code.

EXAMPLE 5

| Child node | Transform codes | Global frequency A | Global frequency B | Global frequency C |
| --- | --- | --- | --- | --- |
| 401 | A, B | 1 | 1 | |
| 402 | A, B, C | 2 | 2 | 1 |
| 403 | C | | | 2 |
| 404 | B, C | | 3 | 3 |
| 405 | A, B | 3 | 4 | |
| 406 | A, B, C | 4 | 5 | 4 |
| 407 | A, B | 5 | 6 | |
| 408 | B, C | | 7 | 5 |
| 409 | A, C | 6 | | 6 |
| Total global frequency | | 6 | 7 | 6 |

As is shown in Example 5, transform code A occurs six times, transform code B occurs seven times and transform code C occurs six times. Therefore the processing component 315 selects the transform code which occurs the greatest number of times as the preferred transform code to be stored. Next the processing component identifies the transform codes generated at each terminal node 401 to 409. If the transform code with the highest global frequency is identified at a terminal node, in isolation or with other transform codes, the transform code with the highest global frequency is the transform code stored. The other transform codes stored at the terminal node are removed from the trie-based dictionary.

Working through FIG. 4, the terminal node 401 comprises transform codes A and B. Transform code A occurs six times within the trie-based dictionary and transform code B occurs seven times. Therefore as transform code B occurs the greater number of times in comparison to transform code A, the processing component 315 selects transform code B as the transform code to be stored and removes transform code A from the terminal node 401. Next the processing component 315 moves to the next terminal node 402. In this instance terminal node 402 comprises transform codes A, B and C. Again, in order to derive the normalized form from the surface form for terminal node 402, transform codes A, B or C may be used. But because transform code B occurs more frequently than transform code A and C within the trie-based dictionary, transform codes A and C are deleted and transform code B is selected and stored within the trie-based dictionary 100 for the terminal node 402.

The next terminal node 403 comprises only one transform code—in this instance transform code C. As transform code C is the only transform code available to restore the surface form to the normalized form, transform code C is stored. The processing component 315 parses each of the terminal nodes in the trie-based dictionary, until there are no further terminal nodes to process. The result of the processing is shown in FIG. 5a and FIG. 5b.

In FIG. 5a each terminal node 401 to 409 has one transform code associated with it. These transform codes are the transform codes which are recognized as occurring the most frequent number of times throughout the trie-based dictionary. This is also shown in the table in Example 6.

EXAMPLE 6

| Terminal node | Transform code |
|---|---|
| 401 | B |
| 402 | B |
| 403 | C |
| 404 | B |
| 405 | B |
| 406 | B |
| 407 | B |
| 408 | B |
| 409 | A |

It can be seen from Example 6 and the representation of the trie-based dictionary of FIG. 5*a* that by selecting and storing the most frequently occurring transform codes and deleting the other transform codes the trie-based dictionary may be compacted further by sharing a reduced number of transform codes among terminal nodes.

Another example of trie-based dictionary is shown in FIG. 5*b*. In this example, each of the terminal nodes 401 to 409 comprises the same transform codes as shown in FIG. 5*a*, except terminal node 409. Moving back to FIG. 4 terminal node 409 comprises the transform codes A and C. Transform codes A and C both occur six times within the trie-based dictionary. Thus either of the transform codes can be stored as either of them can be used. Therefore two possible solutions which are represented by FIGS. 5*a* and 5*b*. FIG. 5*a* depicts terminal node 509 having the transform code A and FIG. 5*b* depicts terminal node 509 having the transform code C.

Figure 6:
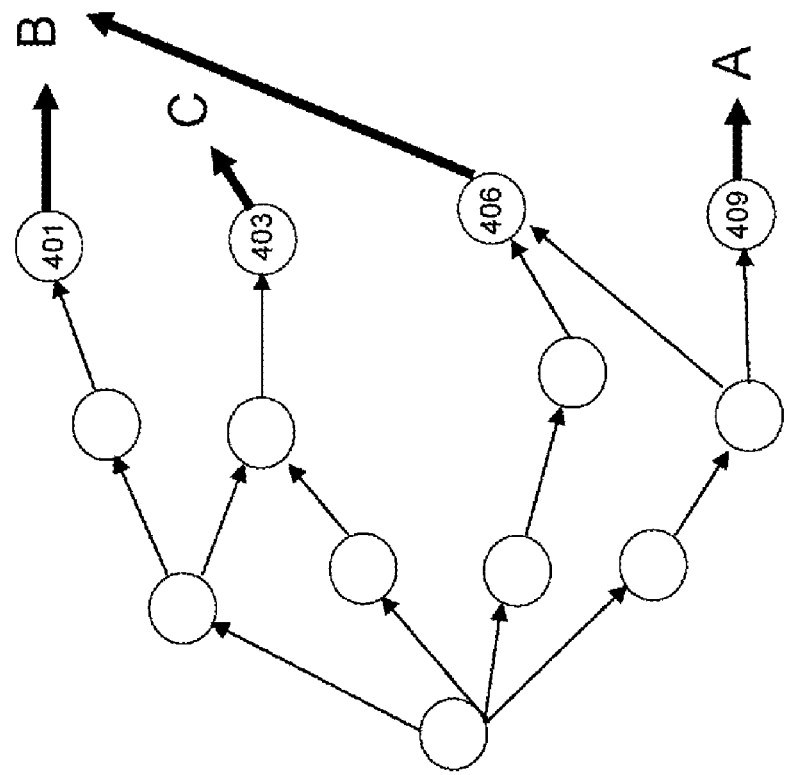
FIG. 6 is an example of a contracted trie-based dictionary using single frequency contraction.
Figure 7:
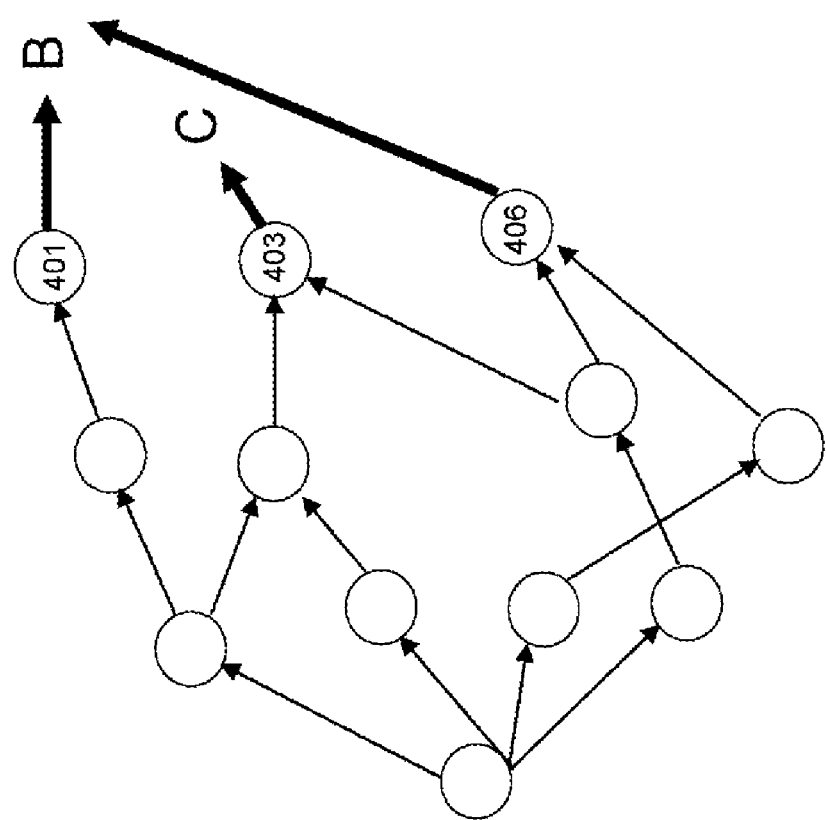
FIG. 7 is an example of a contracted trie-based dictionary using double frequency contraction.

FIGS. 6 and 7 illustrate the trie-based dictionary of FIG. 4, FIG. 5*a* and FIG. 5*b* after postfix contracted has been performed. In order to contract the trie-based dictionary further the transform codes which have 'actually been used' are calculated. This deals with situations in which the global frequency for some terminal nodes is the same. For example in FIG. 4 the global frequency of transform codes A and C is six.

This is illustrated in FIGS. 6 and 7. FIG. 6 shows the contracted trie-based dictionary comprising terminal nodes 401, 403, 406 and 409. Terminal node 401 comprises transform code B, terminal node 403 comprises transform code C, terminal node 406 comprises transform code B and terminal node 409 comprises transform code A. Although the trie-based dictionary is contracted removing the transform codes which occur less frequently and thereby reducing the number of transform codes shared among the terminal nodes within the trie-based dictionary, the trie-based dictionary can benefit from a higher contraction ratio if a further postfix contraction step is performed.

In order to achieve this, the processing component 315 calculates the 'actual usage rate' of the transform codes 401 to 409. For example, in FIGS. 5*a* and 5*b* the third terminal node 403 comprises transform code C and thus transform code C was selected as the preferred transform code. Therefore if transform code C is already selected, whenever the transform codes A and C occur together transform code C will be selected as the preferred transform code to be used.

FIG. 7 shows the final contracted trie-based dictionary with only transform codes B and C stored thereby allowing the reduction of nodes within the trie-based dictionary.

Figure 8:
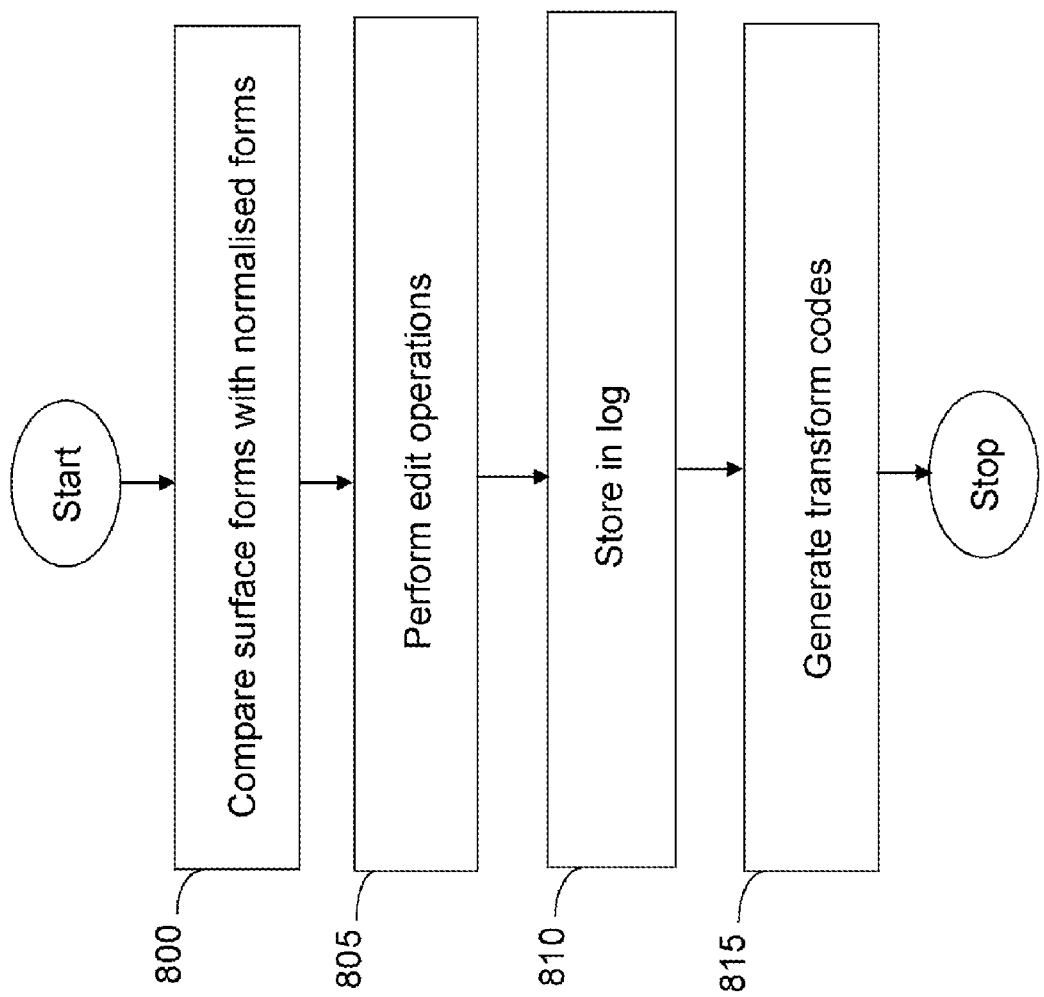
FIG. 8 is a flow chart depicting the operational steps of deriving transform codes in accordance of a preferred embodiment of the present invention.

Referring to FIG. 8 the invention is described in use. At step 800, the parsing component 305 accesses a list of surface forms and their normalized form from a data store 320. The parsing component 305 compares each character of the surface form with each character of the surface form's normalized form.

As each character is compared, the edit component 310 performs a series of accept, delete and insert operations on the surface form in order to derive the normalized form at step 805. The series of edit operations are stored in a log 330 at step 810. Each series of edit operations form a transform code form transforming a surface form into its normalized form. Each transform code is stored with its relevant terminal node in the trie-based dictionary at step 815.

Figure 9:
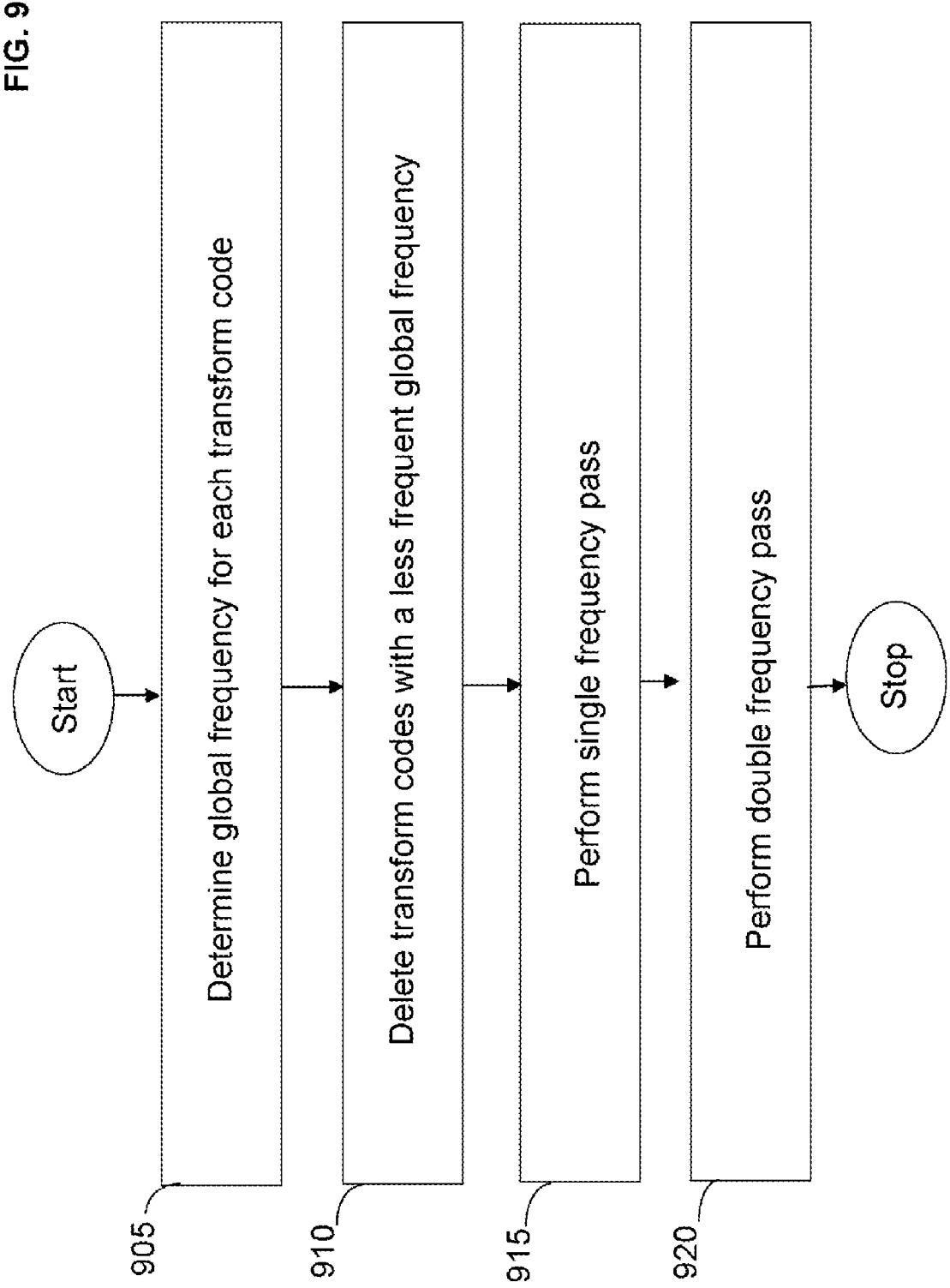
FIG. 9 is a flow chart showing the operational steps of a preferred embodiment of the invention calculating a single and a double frequency contraction ratio of the transform codes in order to further contract the trie-based dictionary.
Figure 10:
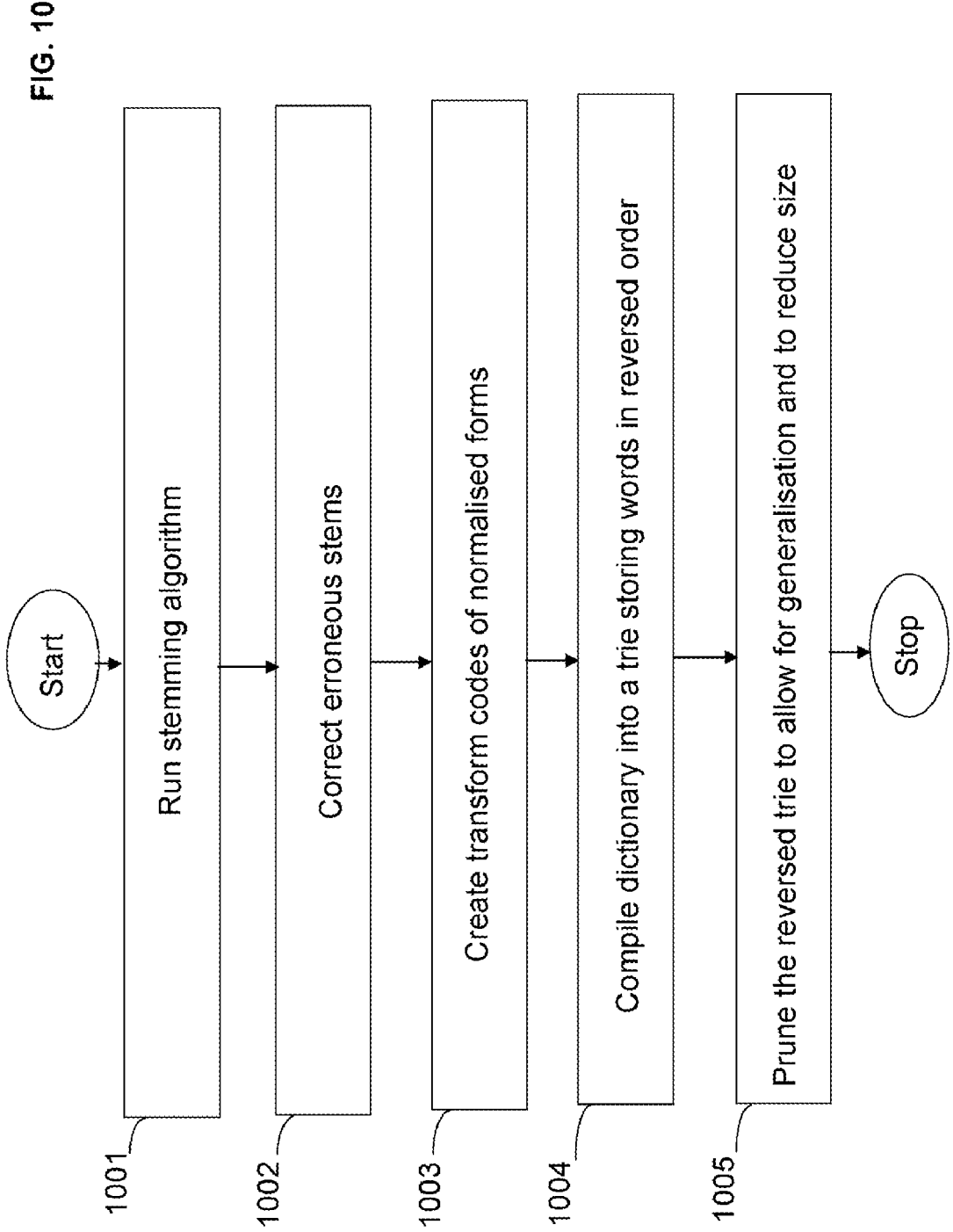
FIG. 10 is a flow chart depicting another embodiment of the present invention.

In order to compact the trie-based dictionary, and with reference to FIG. 9, the processing component 315 determines the global frequency for each of the transform codes at step 905. From the calculation of the global frequency a trie-index is formed and stored with the transform codes. The processing component 315 traverses the trie-based dictionary and selects the transform codes with the highest global frequency for storing with terminal nodes and deletes the transform codes occurring less frequently at step 910.

Once completed the processing component 315 performs a first phase frequency contraction at step 915 by linking the selected transform codes with the relevant terminal nodes as shown in FIGS. 5*a* and 5*b*, thereby reducing the number of transform codes shared among terminal nodes in the trie-based dictionary. At step 920, in order to contract the trie-based dictionary further, a double frequency pass is performed by calculating the 'usage rate' of each transform code.

This addresses the situation where the frequency codes are the same for any particular transform code. The transform code with the highest usage rate is linked to the appropriate terminal nodes. This is shown in FIG. 7 where a better postfix contraction is achieved by merging these trie-dictionary paths having identical terminal nodes transform codes.

The preferred embodiment of the invention has been described in terms of building and contracting a linguistic dictionary where the starting point for building and contracting is a list of known surface forms and associated normalized form. It will be appreciated by a person skilled in the art that the preferred embodiment of the invention may also be utilized with stemming algorithms, which allow for the generation of higher-pedigree of normalized forms more suitable for information retrieval applications, rather than spell checking applications and a pruning algorithm for removing parts of a trie-based dictionary in order to reduce its size.

At step 1001, a list of surface forms and their normalized forms are parsed by the parsing component 305. The parsing component 305 triggers a known stemming algorithm. For example, an S-stemmer utility which parses each of the surface forms and removes the final letter's from each of the normalized words.

If necessary step 1001 may be repeated a number of times using any number of stemming utilities to improve the quality of each of the normalized forms. The output of the stemming utility is a list of normalized forms, for example, if the normalized word is 'stockings', a stemmer utility may remove the characters 'ings' from the end of the word to derive the word 'stock'.

The choice of stemming algorithm is dependent on the linguistic environment in which the invention is to be implemented. The type of stemmer used should improve the normalized form in order to make the normalized form more suitable for information retrieval indexing.

At step 1002 the list of normalized forms may be added to or edited either manually or automatically to allow for the replacement of erroneous entries, thus improving the quality of the list of normalized forms.

At step 1003 the edit operations component 315 determines a series of edit operations in order to derive a set of transform codes describing the transformation of each of the surface forms to its normalized form as described with reference to FIG. 8.

At step 1004 a trie-based dictionary is built using a list of surface forms which are added to the trie-based dictionary in reverse order character by character. For example, FIG. 11 shows a trie-based dictionary with the words 'king', 'ring', 'going', 'doing' and 'eating' being input into the trie-based dictionary in reverse order.

Rules are associated with each of the terminal nodes to define the required normalized forms. The rules may comprise transform codes as previously described, applied to the trie-based dictionary in direct or reverse order of characters, or for example, any other algorithmic normalization procedure. For example the word can be translated to lowercase before applying the rule, or German "Sharp S" characters may be replaced by two 's' characters. For European languages the transform code is accompanied by a value that requests case conversion (lowercasing or capitalization of the word).

Figure 11:
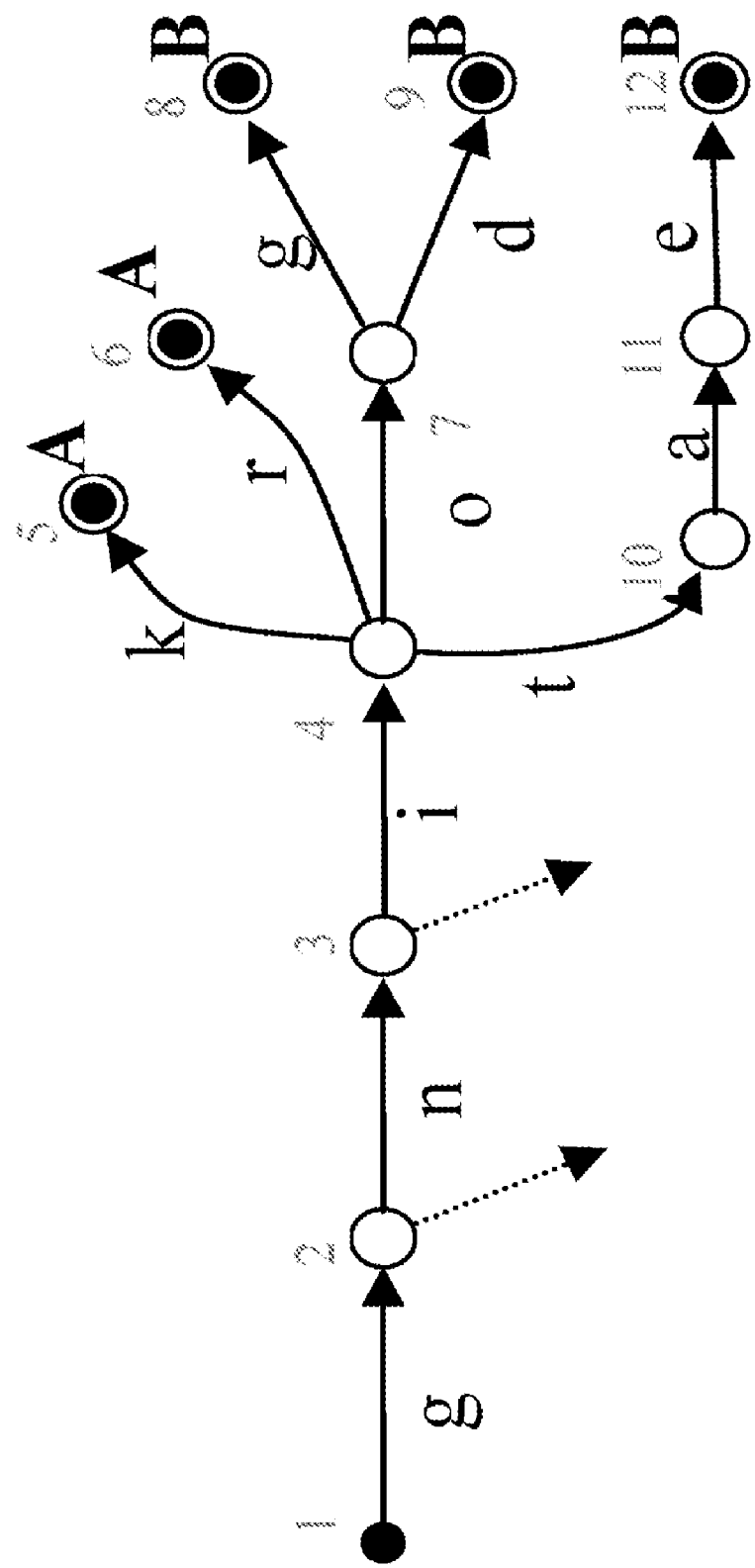
FIG. 11 illustrates a pruning technique which the preferred embodiment of the present invention may interact with in order to reduce the trie-based data structure.

In the example in FIG. 11 the transform codes, Rule A and Rule B, comprise a series of edit operations which detail the edit operations to perform to derive a normalized form from a surface form. Rule A is associated with node 5 and comprises an empty transformation code because no transformation is required. Rule B is associated with node 7 and comprises a transform code which removes the last three characters from the words 'going', 'doing' and 'eating'.

At step 1005, a pruning algorithm is applied to the trie-based dictionary. The pruning algorithm associates generic rules with some of the nodes and removes unnecessary nodes from the trie-based dictionary. A generic rule can be associated to either terminal or non terminal nodes, and defines the default rule that should be applied to each word that proceeds through the node which comprises a rule. Once a generic rule is specified, a number of nodes maybe removed from the trie-based dictionary, as a generic rule may cover more than one state. For example, in FIG. 11 a generic rule (Rule B) is associated with node 4. The nodes 6, 7, 8, 9 can be removed. The words 'going', 'doing' and 'eating' will proceed through node 4 and will be assigned the Rule B by default.

Similarly, any other word that was not originally in the dictionary but passes through the node 4, such as 'singing' or 'loading', will be assigned Rule B, except for the words 'king' and 'ring', which will still lead to node 5 and consequently Rule A.

Applying the pruning algorithm does not result in a loss of information provided that the lookup procedure is modified to detect the generic rules during look-up, i.e. every word that was originally in the dictionary will be recognized properly. The words can not be restored, once the dictionary is pruned; the pruned dictionary can not be used for spellchecking operations.

The pruning algorithm may be implemented as a recursive procedure that is applied to every node of the trie-based structure. Below is the pseudo code which shows the logic the recursive procedure follows in order to carry out the pruning process.

```
prune_node(Node n, Algorithmic_Rule current_rule)
  remove_node = true // The node n can be removed unless found otherwise
  FOREACH child_node of n
    IF n is a final node // with no outgoing transitions
      Get the algorithmic child_rule
      IF the current_rule is equal to the child_rule
        Remove the child_node
      ELSE
        Remove_node = false
    ELSE // for all other nodes
      Calculate the most_popular_rule of the child_node
      IF the most_popular_rule equals the current_rule
      IF prune_node(child_node, most_popular_rule) returns true
        Remove the child_node
      ELSE
        remove_node = false // We cannot remove node n
      ELSE // The child_rule is not equal to the current_rule
        Attach the most_popular_rule to the child_node as a generic rule
              prune_node(child_node, most_popular_rule)
        remove_node = false
  // End of FOREACH loop
  return remove_node
// End of METHOD prune_node
```

Figure 12:
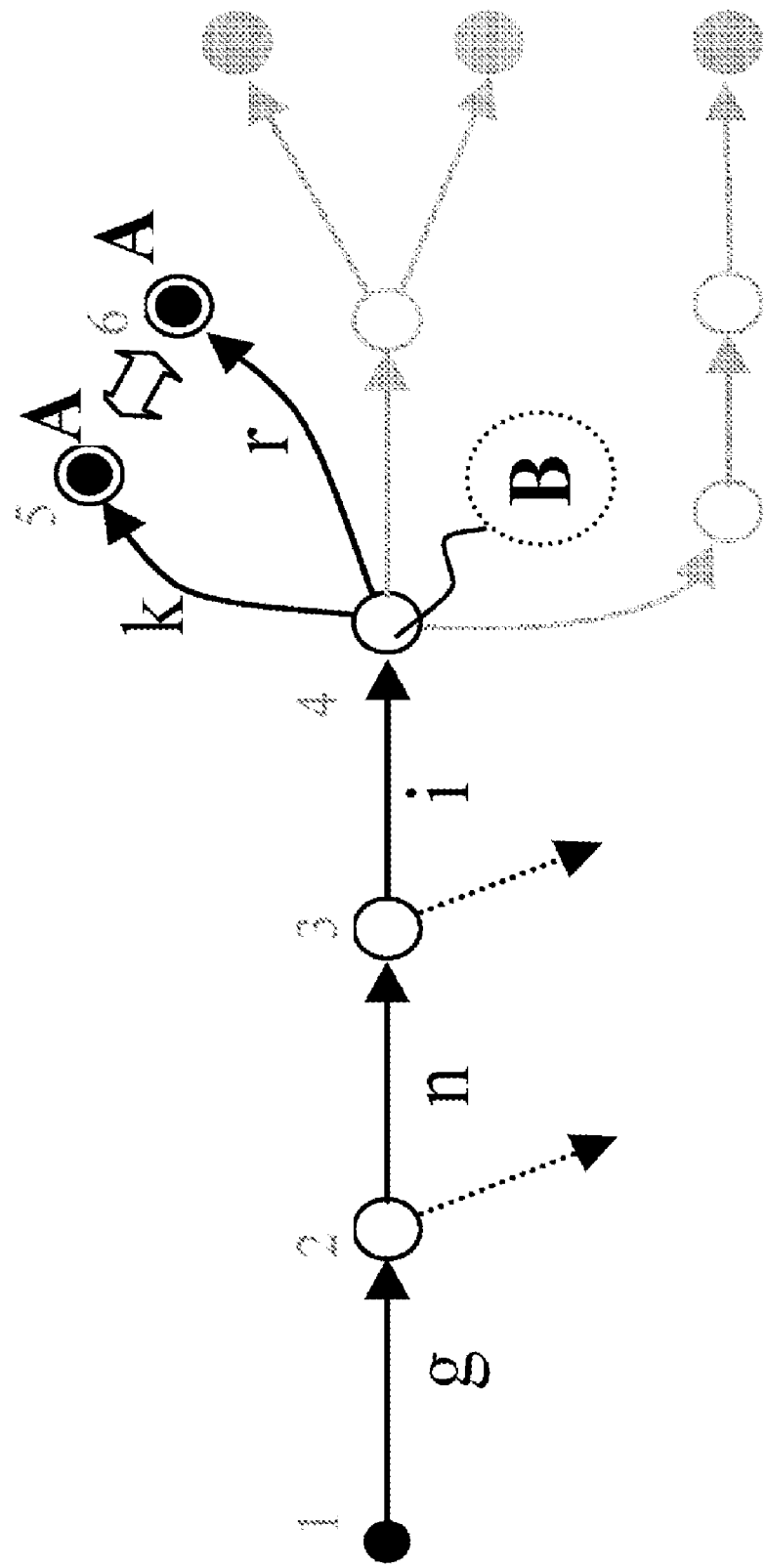
FIG. 12 is an example of a pruned trie-based data structure in accordance with a preferred embodiment of the invention.

In FIG. 12 the pruning algorithm is instructed to begin to parse the trie-based structure. The pruning algorithm starts by parsing node 1 and is recursively called for the children of node 1 (nodes 2, 3, 4, 5, 6, 7, 8, 9, 10, 11, 12). At node 4 the pruning algorithm detects that the words 'going', 'eating' and 'doing' are accessible from node 4 and each of these words is associated with Rule B.

At this point the pruning algorithm keeps a count of how many times Rule B is used, i.e. three times, to determine the frequency count of the rule. The same process is followed for Rule A.

As Rule B is associated with the words 'going', 'doing' and 'eating' via node 4, a generic rule comprising Rule B is generated and associated with Node 4. Thus the nodes 8, 9, 10, 11 and 12 are deleted from the trie-based dictionary.

The pruning algorithm traverses the structure via the k-transition ('king') to child node 5 of node 4. Rule A is compared to Rule B, currently used as most frequent, and as the rules are not equal no pruning is required.

The pruning algorithm moves back to node 4 and proceeds to the child nodes of node 4 via the r-transition ('ring'). The r-transition brings the pruning algorithm to node 6. Again, Rule A is compared with the default Rule B. The comparison determines that the rules are not equal and thus no pruning is required.

The remaining sub-tree of node 4 is traversed, via the o-transition ('doing') and the t-transition ('eating'). Since the Rule B in the remaining terminal nodes is reachable from node 4 and is equal to the Rule B implied by the generic rule in node 4, the remaining sub-trees can be pruned from the structure. Because not all of the children of node 4 can be removed, node 4 itself can not be removed.

Pruning continues until each node of the trie-based structure has been traversed. FIG. 12 shows the trie-based structure after pruning has completed with only the words 'king' and 'ring' remaining. The words 'king' and 'ring' are exceptions to the general rule i.e. Rule B.

After applying the pruning algorithm, a contraction can be performed, replacing identical nodes 5 and 6 with a single node. When performing information retrieval the words are fed into the dictionary backwards, starting with the last character.

A lookup is performed to locate a rule. If a terminal node is reached it defines the rule; otherwise the last-met rule is used.

Therefore when the words 'king' and 'ring' are encountered, an exact match is located resulting in application of Rule A, producing 'king' and 'ring' as results of normalization. Any other word that ends with -'ing' will receive Rule B by default at node 4 and will be normalized by cutting the last three characters. The behavior of the algorithm for words that end with 'king' and 'ring' is defined by specifying most frequent policy for single nodes.

What is claimed is:

1. A method for building and contracting a linguistic dictionary, the linguistic dictionary comprising a list of surface forms and a list of normalized forms, each normalized form being associated with a surface form, comprising
    comparing, using a processor, each character of a surface form with each character of a normalized form of the surface form;
    in response to the comparing, determining an edit operation for each character compared; and
    generating a transform code from the set of the edit operations specifying how to transform the surface form to the normalized form, wherein
    the normalized form specifies a first form of a particular word, and
    the surface form specifies a second and different form of the particular word.

2. The method of claim 1, wherein
the edit operation comprises deleting a character, retaining a character, inserting a character or replacing a character within the surface form for deriving the normalized form from the surface form.

3. The method of claim 1, further comprising determining a global frequency for each of the generated transform codes.

4. The method of claim 3, further comprising calculating whether a surface form comprises more than one transform code.

5. The method of claim 3 further comprising identifying, for each surface form having more than one transform code, whether at least one of the transform codes as having a higher global frequency than the other transform codes.

6. The method of claim 5, wherein
the transform code with the higher global frequency replaces the transform code having a lower global frequency.

7. The method of claim 6, wherein
the transform code having the higher global frequency is shared across surface forms.

8. The method of claim 7, further comprising calculating a usage rate of the highest occurring transform codes and selecting the transform code with the highest usage rate as the preferred transform code for storing.

9. The method of claim 1, wherein
the linguistic dictionary comprises a trie-based data structure.

10. The method of claim 1, wherein
the surface forms and normalized forms comprise Arabic surface forms and normalized forms.

11. The method of claim 1 further comprising the steps of stemming the surface forms to derive a normalized form and applying a pruning algorithm.

12. The method of claim 11 wherein the stemming step comprises generating a trie-based index for an information retrieval application.

13. A computer hardware system for building and contracting a linguistic dictionary, the linguistic dictionary comprising a list of surface forms and a list of normalized forms, each normalized form being associated with a surface form, comprising:
    a processor including a parsing component and an edit operation component, wherein
    the parsing component is configured to compare each character of a surface form with each character of a normalized form of the surface form; and
    the edit operation component is configured to
        determine an edit operation for each character compared, and
        generate a transform code from the set of the edit operations specifying how to transform the surface form to the normalized form, the normalized form specifies a first form of a particular word, and the surface form specifies a second and different form of the particular word.

14. The system of claim 13, wherein
the edit operation comprises deleting a character, retaining a character, inserting a character or replacing a character in the surface form for deriving the normalized form of the surface form.

15. The system of claim 13, wherein
the processor further includes a determining component configured to determine a global frequency for each of the generated transform codes.

16. The system of claim 15, wherein
the processor is configured to identify, for each surface form having more than one transform code, whether at least one of the transform codes is determined as having a higher global frequency than the other transform codes.

17. The system of claim 16, wherein
the transform code with the higher global frequency replaces the transform code having a lower global frequency.

18. The system of claim 17, wherein
the transform code having the higher global frequency is shared across surface forms.

19. The system of claim 13, wherein
the processor is configured to calculate whether a surface form comprises more than one transform code.

20. The system of claim 13, wherein
the linguistic dictionary comprises a trie-based data structure.

21. The system of claim 13, wherein
the surface forms and normalized forms comprise Arabic surface forms and normalized forms.

22. The system of claim 18, wherein
the processor is configured to
    calculate a usage rate of the highest occurring transform codes and
    select the transform code with the highest usage rate as the preferred transform code for storing.

23. A computer program product comprising a computer usable storage medium having stored therein computer usable program code, which when executed on a computer hardware system, causes the computer hardware system to perform:
    comparing each character of a surface form with each character of a normalized form of the surface form;
    in response to the comparing, determining an edit operation for each character compared; and
    generating a transform code from the set of the edit operations specifying how to transform the surface form to the normalized form, wherein
    the normalized form specifies a first form of a particular word, and
    the surface form specifies a second and different form of the particular word.

* * * * *